United States Patent
Hubbard et al.

(10) Patent No.: US 10,141,817 B2
(45) Date of Patent: Nov. 27, 2018

(54) COOLING OF MACHINE FOR ELEVATOR SYSTEM

(71) Applicant: OTIS ELEVATOR COMPANY, Farmington, CT (US)

(72) Inventors: James L. Hubbard, Kensington, CT (US); Marco Venturini, Genoa (IT); Davide Tenti, Genoa (IT)

(73) Assignee: OTIS ELEVATOR COMPANY, Farmington, CT (US)

( * ) Notice: Subject to any disclaimer, the term of this patent is extended or adjusted under 35 U.S.C. 154(b) by 171 days.

(21) Appl. No.: 14/893,591

(22) PCT Filed: May 28, 2013

(86) PCT No.: PCT/US2013/042874
§ 371 (c)(1),
(2) Date: Nov. 24, 2015

(87) PCT Pub. No.: WO2014/193341
PCT Pub. Date: Dec. 4, 2014

(65) Prior Publication Data
US 2016/0126810 A1 May 5, 2016

(51) Int. Cl.
*H02K 9/22* (2006.01)
*B66B 11/04* (2006.01)
(Continued)

(52) U.S. Cl.
CPC .............. *H02K 9/22* (2013.01); *B66B 11/043* (2013.01); *H02K 3/24* (2013.01); *H02K 9/04* (2013.01)

(58) Field of Classification Search
CPC ............ H02K 1/187; H02K 1/20; H02K 9/00; H02K 9/22; B66B 11/043; B66B 11/0438
See application file for complete search history.

(56) References Cited

U.S. PATENT DOCUMENTS 1,360,483 A * 11/1920 Wiard ............... H02K 9/00
310/62
2,161,417 A * 6/1939 Holmes ............... F24H 1/18
122/18.5
(Continued)

FOREIGN PATENT DOCUMENTS

| CN | 201319547 Y | 9/2009 |
|---|---|---|
| CN | 102365225 A | 2/2012 |
| CN | 102471028 A | 5/2012 |

OTHER PUBLICATIONS

Notification of Transmittal of the International Search Report and the Written Opinion of the International Searching Authority, or the Declaration; PCT/US2013/042874; dated Feb. 25, 2014; 9 pages.
(Continued)

*Primary Examiner* — Minh Truong
(74) *Attorney, Agent, or Firm* — Cantor Colburn LLP

(57) ABSTRACT

In one embodiment, an electric machine includes a rotor including a plurality of permanent magnets and rotatable about a central axis of the machine. The machine further includes a stator including a cylindrical stator shell and a plurality of stator windings positioned at the stator shell and located radially inboard of the plurality of permanent magnets. A plurality of heat sink segments are secured to a radially inboard surface of the stator shell. Each heat sink segment of the plurality of heat sink segments includes a base portion located at the radially inboard surface and a plurality of fins extending radially inwardly from the base portion.

17 Claims, 7 Drawing Sheets

(51) Int. Cl.
*H02K 9/04* (2006.01)
*H02K 3/24* (2006.01)

(56) References Cited

U.S. PATENT DOCUMENTS

| | | | | |
|---|---|---|---|---|
| 3,188,833 A | * | 6/1965 | Robinson | H02K 9/20 |
| | | | | 310/54 |
| 3,280,907 A | * | 10/1966 | Hoffman | H01L 23/4093 |
| | | | | 165/183 |
| 3,556,206 A | * | 1/1971 | Trijonis | F28F 1/36 |
| | | | | 165/131 |
| 5,592,731 A | * | 1/1997 | Huang | H02K 1/16 |
| | | | | 29/596 |
| 5,986,377 A | * | 11/1999 | Yamada | H02K 1/148 |
| | | | | 310/216.013 |
| 6,742,573 B2 | * | 6/2004 | Sasaki | H01L 23/3672 |
| | | | | 165/185 |
| 8,395,289 B2 | * | 3/2013 | Tian | H02K 5/18 |
| | | | | 310/61 |
| 2002/0056593 A1 | | 5/2002 | Adifon et al. | |
| 2003/0121727 A1 | | 7/2003 | Adifon et al. | |
| 2004/0084977 A1 | | 5/2004 | Devine | |
| 2004/0183385 A1 | | 9/2004 | Takahashi et al. | |
| 2005/0023926 A1 | | 2/2005 | Aulanko et al. | |
| 2010/0289351 A1 | | 11/2010 | Maeda et al. | |
| 2012/0112577 A1 | | 5/2012 | Strbuncelj et al. | |
| 2013/0026868 A1 | * | 1/2013 | Klafter | H02K 9/06 |
| | | | | 310/62 |
| 2014/0183991 A1 | * | 7/2014 | Kulkarni | H02K 5/20 |
| | | | | 310/59 |
| 2017/0077779 A1 | * | 3/2017 | Hanioka | H02K 5/18 |

OTHER PUBLICATIONS

Chinese Office Action dated Aug. 1, 2017 in Application No. 201380076966.7; Filed May 28, 2013; 11 Pages.

* cited by examiner

COOLING OF MACHINE FOR ELEVATOR SYSTEM

BACKGROUND

The subject matter disclosed herein relates to electric machines. More specifically, the subject disclosure relates to cooling of electric machines.

Electric motors are used in a variety of systems. For example, elevator systems utilize ropes or coated steel belts operably connected to an elevator car, and driven by a motor, also referred to as a machine, to propel the elevator car along a hoistway. The machine drives a sheave, in this case a traction sheave, over which the rope or coated steel belt is routed. The rope or belt gains traction at the traction sheave, such that rotation of the traction sheave consequently drives movement of the elevator car.

The machine is typically a permanent magnet electric machine including a stator having one or more conductive stator windings and a rotor including one or more permanent magnets. During operation, the stator windings generate high levels of thermal energy which must be dissipated so that the machine can remain operational. To cool the stator windings, a blower is typically utilized to blow cooling air across the stator windings or around an outer diameter of the stator. Improvements in heat dissipation from the stator contribute to increased operational efficiency and reliability of the machine and thus the elevator system.

BRIEF DESCRIPTION

In one embodiment, an electric machine includes a rotor including a plurality of permanent magnets and rotatable about a central axis of the machine. The machine further includes a stator including a cylindrical stator shell and a plurality of stator windings positioned at the stator shell and located radially inboard of the plurality of permanent magnets. A plurality of heat sink segments are secured to a radially inboard surface of the stator shell. Each heat sink segment of the plurality of heat sink segments includes a base portion located at the radially inboard surface and a plurality of fins extending radially inwardly from the base portion.

In another embodiment, an elevator system includes an elevator car and a drive member operably connected to the elevator car. A traction sheave is in frictional contact with the drive member and a machine is operably connected to the traction sheave. The machine includes a rotor including a plurality of permanent magnets and rotatable about a central axis of the machine. The machine further includes a stator including a cylindrical stator shell and a plurality of stator windings positioned at the stator shell and located radially inboard of the plurality of permanent magnets. A plurality of heat sink segments are secured to a radially inboard surface of the stator shell. Each heat sink segment of the plurality of heat sink segments includes a base portion located at the radially inboard surface and a plurality of fins extending radially inwardly from the base portion.

In yet another embodiment, a method of cooling stator windings of an electric machine includes urging a cooling airflow into the machine toward a stator assembly of the machine. The stator assembly includes a cylindrical stator shell and a plurality of stator windings positioned at the stator shell and located radially inboard of a rotor of the machine. A plurality of heat sink segments are secured to a radially inboard surface of the stator shell. Each heat sink segment of the plurality of heat sink segments includes a base portion located at the radially inboard surface and a plurality of fins extending radially inwardly from the base portion. The cooling airflow is flowed across the plurality of heat sink segments, thus transferring thermal energy between the cooling airflow and the plurality of stator windings.

The detailed description explains the invention, together with advantages and features, by way of examples with reference to the drawings.

DETAILED DESCRIPTION

Figure 1A:
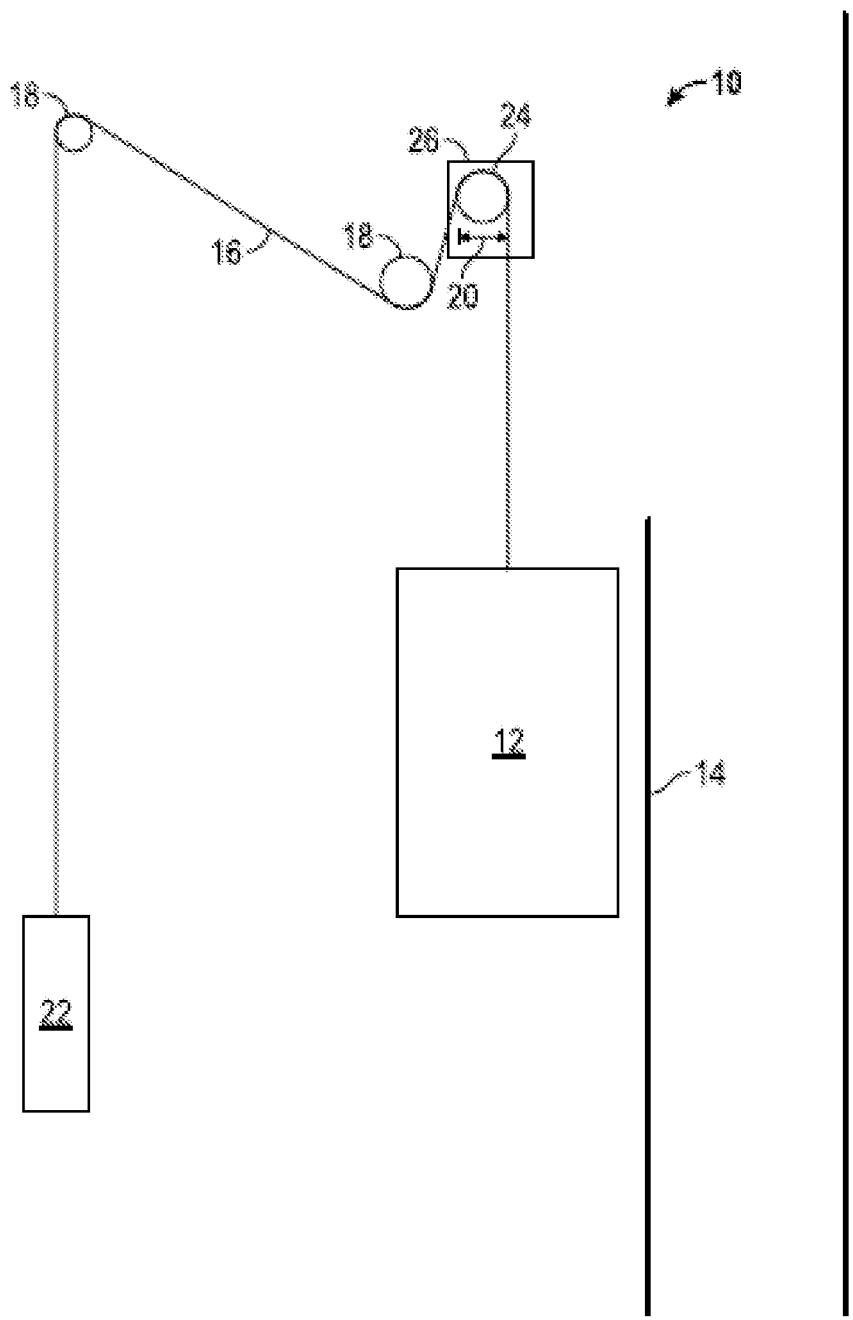
FIG. 1A is a schematic of an exemplary elevator system having a 1:1 roping arrangement.
Figure 1B:
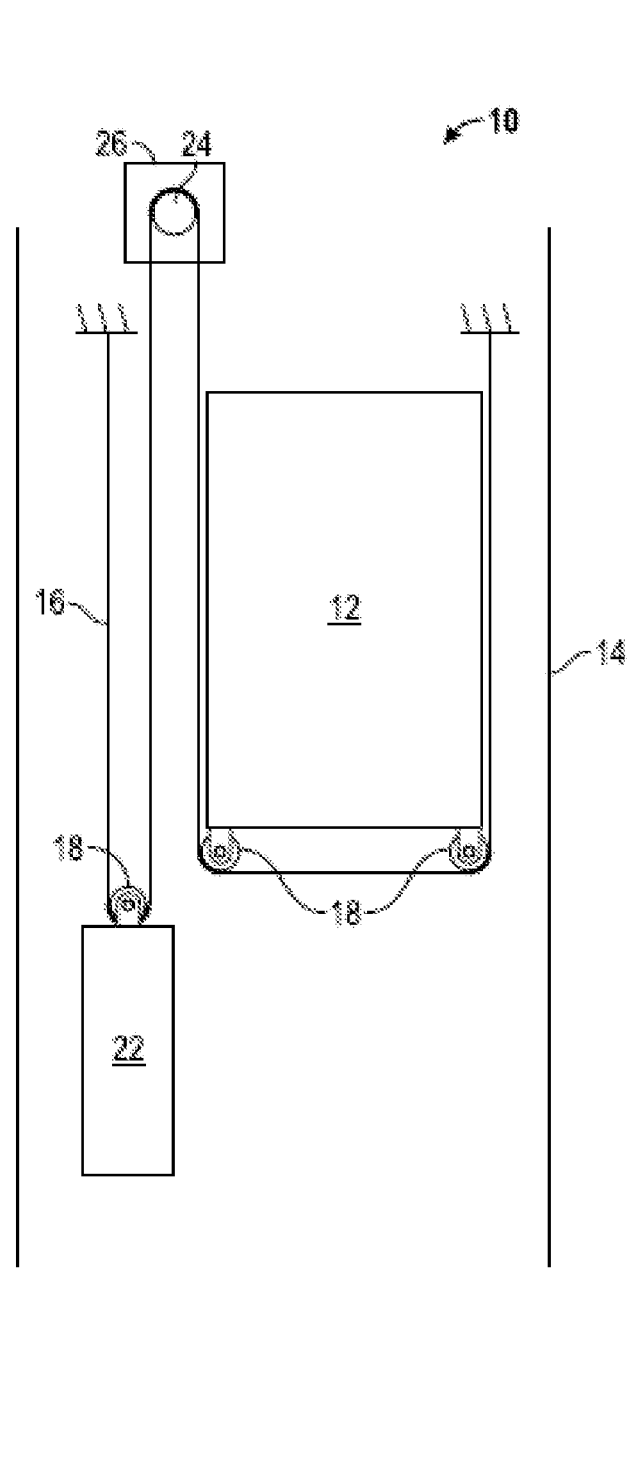
FIG. 1B is a schematic of another exemplary elevator system having a different roping arrangement.
Figure 1C:
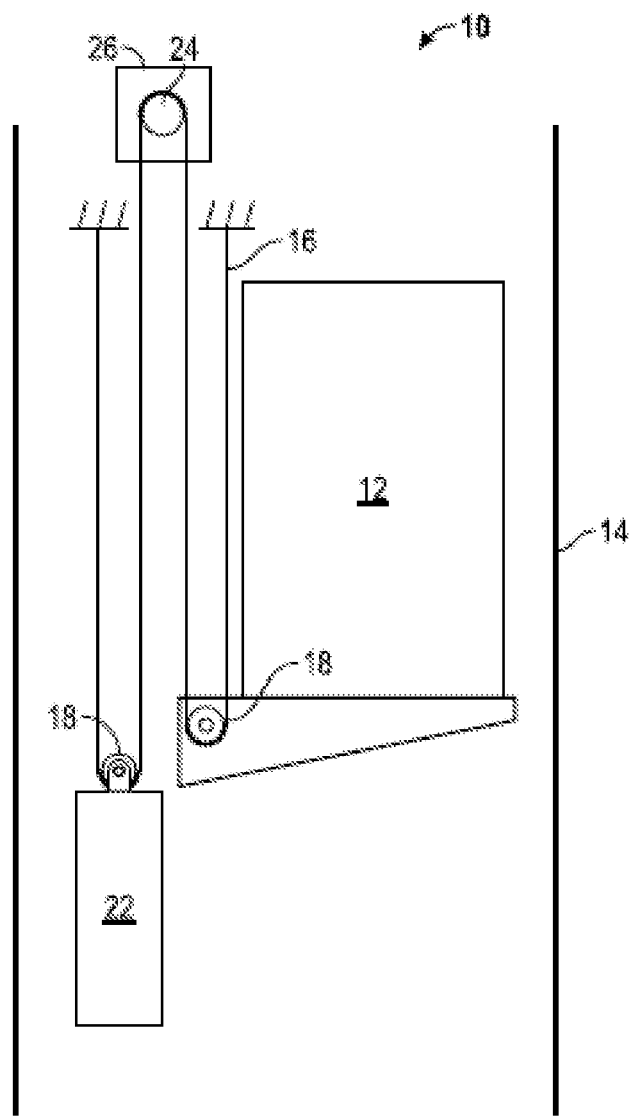
FIG. 1C is a schematic of another exemplary elevator system having a cantilevered arrangement.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more drive members 16. The drive member 16 may be, for example a rope of a coated steel belt. The one or more drive members 16 interact with one or more sheaves 18 to be routed around various components of the elevator system 10. The one or more drive members 16 could also be connected to a counterweight 22, which is used to help balance the elevator system 10 and reduce the difference in belt tension on both sides of a traction sheave 24 during operation.

The traction sheave 24 is driven by a machine 26. Movement of the traction sheave 24 by the machine 26 drives, moves and/or propels (through traction) the one or drive members 16 that are routed around the traction sheave 24.

In some embodiments, the elevator system 10 could use two or more drive members 16 for suspending and/or driving the elevator car 12. In addition, the elevator system 10 could have various configurations such that either both sides of the one or more drive members 16 engage the one or more sheaves 18 (such as shown in the exemplary elevator systems in FIG. 1A, 1B or 1C) or only one side of the one or more drive members 16 engages the one or more sheaves 18.

FIG. 1A provides a 1:1 roping arrangement in which the one or more drive members 16 terminate at the car 12 and counterweight 22. FIGS. 1B and 1C provide different roping arrangements. Specifically, FIGS. 1B and 1C show that the car 12 and/or the counterweight 22 can have one or more sheaves 18 thereon engaging the one or more drive members 16 and the one or more drive members 16 can terminate elsewhere, typically at a structure within the hoistway 14 (such as for a machineroomless elevator system) or within the machine room (for elevator systems utilizing a machine room). The number of sheaves 18 used in the arrangement determines the specific roping ratio (e.g., the 2:1 roping ratio shown in FIGS. 1B and 1C or a different ratio). FIG. 1C also provides a cantilevered type elevator. The present invention could be used on elevator systems other than the exemplary types shown in FIGS. 1A, 1B and 1C.

Figure 2:
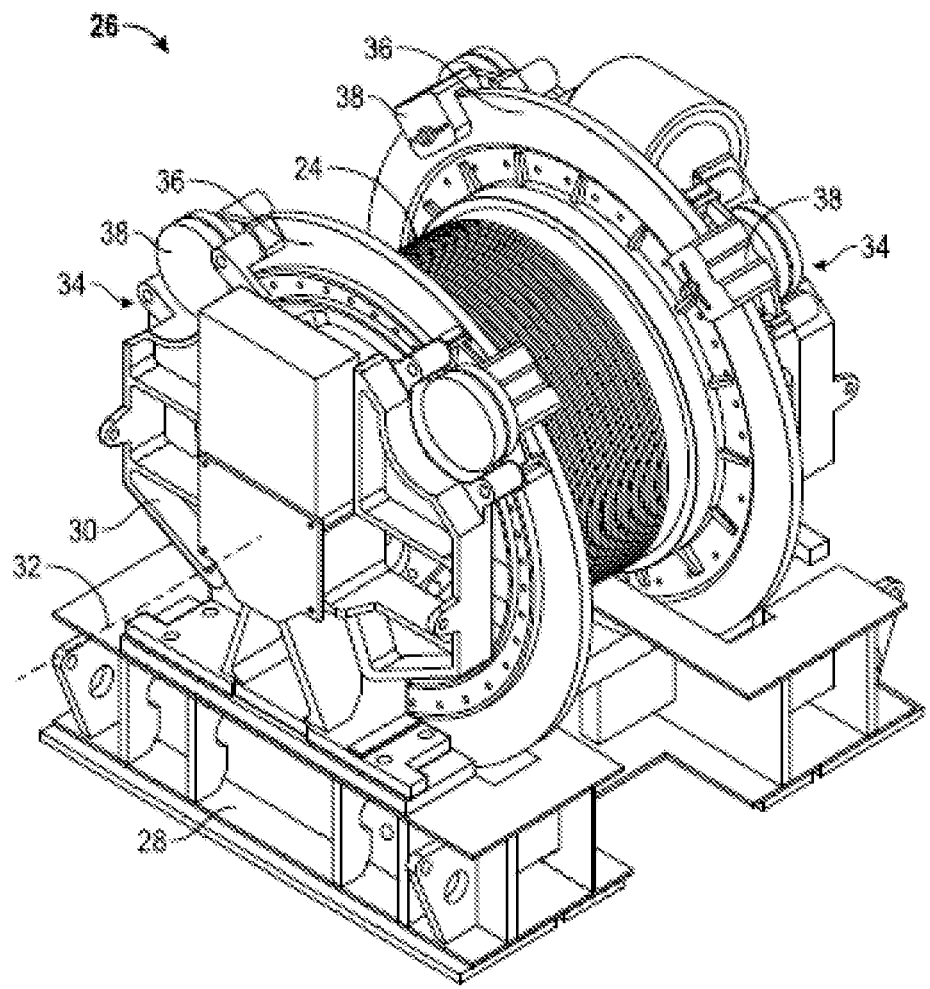
FIG. 2 is a perspective view of an embodiment of a machine for an elevator system.

Referring to FIG. 2, the machine 26 typically includes a bed plate 28 and a stand 30 fixed to the bed plate 28. The traction sheave 24 is rotatably secured to the stand 30 to rotate about a machine axis 32. The machine 26 further includes brake assemblies 34, including brake discs 36 rotatable with the traction sheave 24, and brake calipers 38 fixed to the stand 30. When the brake calipers 38 engage the brake discs 36, rotation of the traction sheave 24 about the machine axis 32 is slowed or stopped.

Figure 3:
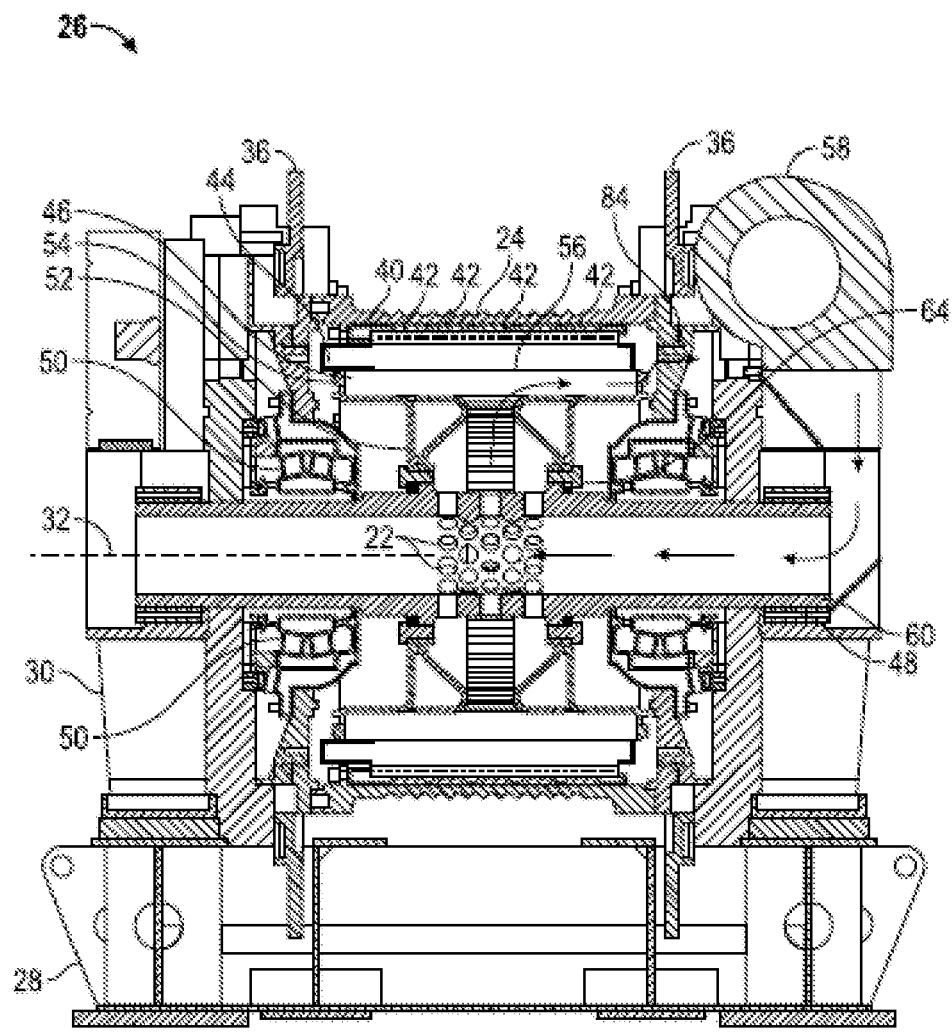
FIG. 3 is a cross-sectional view of an embodiment of a machine for an elevator system.

Referring now to the cross-sectional view of FIG. 3, the machine 26 is a permanent magnet electric machine, in this embodiment, an inside-out permanent magnet electric machine, meaning that a rotor 40, notably permanent magnets 42 of the rotor 40, are located radially outboard of stator windings 44 of a stator 46 of the machine 26. The traction sheave 24 is fixed to the rotor 40 to rotate therewith. The machine 26 includes a central shaft 48 located along the machine axis 32. Rotor bearings 50 are located at the shaft 48 between the shaft 48 and the rotor 40 to support the rotor 40 and allow for rotation of the rotor 40 relative to the fixed shaft 48 about the machine axis 32. The stator 46 is fixed to the shaft 48 via a stator support 52 that extends radially outwardly to a stator hub 54. The stator hub 54 supports the stator windings 44, located at a radially outboard surface 56 of the stator hub 54.

A blower 58 is fixed to the stand 30 to urge a cooling airflow 58 into the machine 26 to cool the stator windings 44. The airflow 58 is directed into the shaft 48 at, for example, an open end 60 of the shaft 48 and exits the shaft 48 at one or more cooling openings 62 located at, for example, an axial center portion of the shaft 48. The cooling flow leaving the shaft 48 is circulated through an interior 64 of the stator hub 54 before exiting the machine 26 at, for example, brake disc openings 84. While circulating in the interior 64, the airflow 58 exchanges thermal energy with the stator windings 44 via the stator hub 54, thus cooling the stator windings 44.

Figure 4:
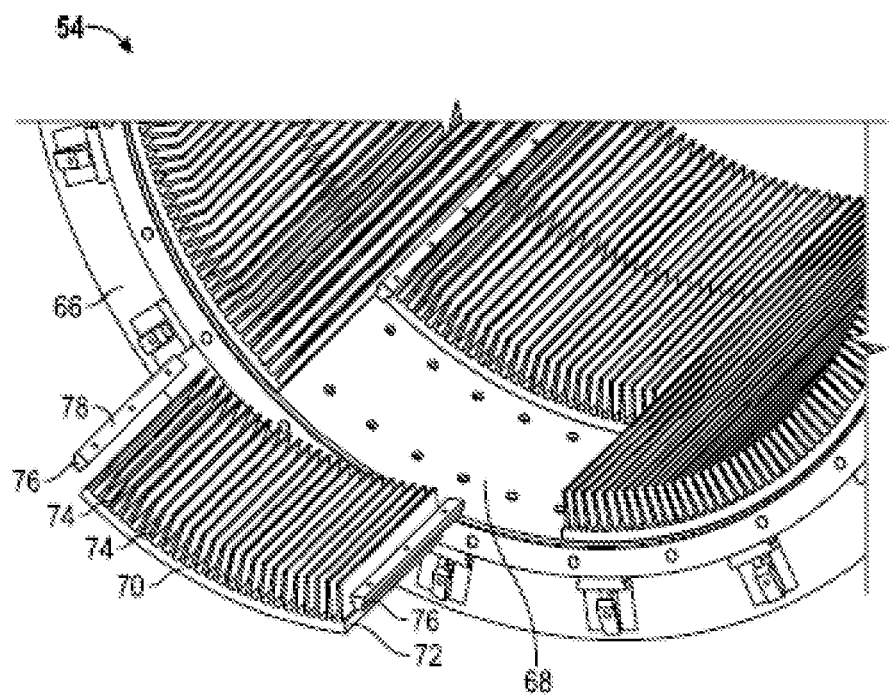
FIG. 4 is a view of an embodiment of a stator assembly for a machine.

Referring now to FIG. 4, the stator hub 54 includes a cylindrical shell 66 having an inboard shell surface 68. The shell 66 is typically formed from steel or cast iron. A plurality of heat sink segments 70 are secured to the inboard shell surface 68. Each heat sink segment 70 includes a base 72 secured to the inboard shell surface 68, with a plurality of fins 74 extending radially inboard from the base 72 toward the machine axis 32. The fins 74 increase an effective surface area for thermal energy transfer between the airflow 58 and the stator windings 44, thus increasing an effectiveness of the airflow 58 in cooling the stator windings 44. To further enhance cooling, the heat sink segments 70 may be formed from a highly thermally conductive material such as aluminum. Further, the heat sink segments 70 may be formed by extrusion or other means to increase flexibility in design and manufacture. The heat sink segments 70 are arranged circumferentially around the inboard shell surface 68, and as shown in FIG. 4, may also be arranged axially along the inboard shell surface 68. As such, the heat sink segments 70 may be identical to each other, or may differ in fin 74 size, shape, number, etc., to tune heat transfer performance of the stator hub 54.

The heat sink segments 70 are secured to the shell 66 via retention blocks 76 located at each end of the heat sink segment 70. The retention block 76 includes a retention flange 78 to capture the base 72 between the retention flange 78 and the shell 66. One or more mechanical fasteners (not shown) are then installed in the retention block 76 to secure the retention block 76 to the shell 66.

Figure 5:
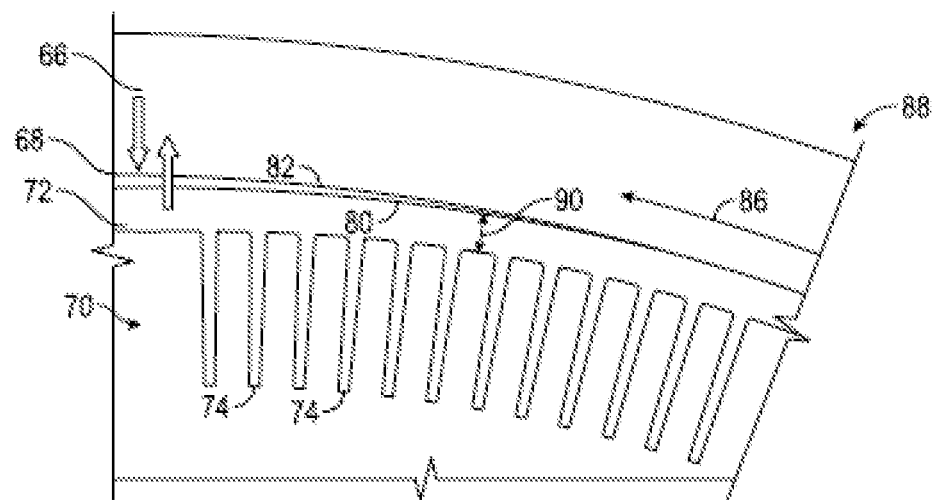
FIG. 5 is a partial cross-sectional view of an embodiment of a stator assembly.

The heat sink segments 70 are formed including features to enhance contact with the shell 66 when installed. As shown in FIG. 5, an outer base radius 80 is smaller than an inner shell radius 82. When installing the heat sink segment 70, the heat sink segment 70, formed of a softer material, is pulled into conformance with the inner shell radius 82, ensuring a greater degree of contact therebetween. To further improve uniformity of contact along the heat sink segment 70, in some embodiments a base thickness 90 varies along a circumferential length 86 of the heat sink segment 70. In one embodiment, the base thickness 90 decreases with distance from a circumferential center 88 of the heat sink segment 70. The decrease in base thickness 86 may be achieved via a continuous taper or alternatively via a series of discrete steps. Further, a conductive grease may be utilized between the shell 66 and the heat sink segments 70 to enhance thermal energy transfer therebetween.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electric machine comprising:
   a rotor including a plurality of permanent magnets, the rotor rotatable about a central axis of the machine;
   a stator including:
   a cylindrical stator shell;
   a plurality of stator windings disposed at the stator shell and located radially inboard of the plurality of permanent magnets;
   two or more heat sink segments secured to a radially inboard surface of the stator shell, each heat sink segment of the two or more heat sink segments including:
   a base portion located at the radially inboard surface; and
   a plurality of fins extending radially inwardly from the base portion, the base portion having two or more fins of the plurality of fins extending therefrom;
   wherein a base thickness of the base portion of each heat sink segment decreases with distance extending circumferentially away from a circumferential center of the base portion.

2. The machine of claim 1, wherein the two or more heat sink segments and the stator shell are formed from dissimilar materials.

3. The machine of claim 1, wherein the two or more heat sink segments are formed from aluminum.

4. The machine of claim 1, wherein an outer base radius of each heat sink segment is less than an inner shell radius of the stator shell.

5. The machine of claim 1, further comprising a blower to urge a cooling airflow across the two or more heat sink segments to cool the plurality of stator windings.

6. The machine of claim 1, further comprising a central shaft to convey a cooling airflow toward the two or more heat sink segments.

7. The machine of claim 1, further comprising a retention block disposed between adjacent heat sink segments of the two or more heat sink segments to secure the heat sink segments to the stator shell.

8. The machine of claim 7, wherein the retention block includes a retention flange such that the base portion of a heat sink segment is retained radially between the retention flange and the stator shell.

9. The machine of claim 1, wherein at least two heat sink segments are axially adjacent in the stator shell.

10. The machine of claim 1, wherein upon installation, a base portion of a heat sink segment of the two or more heat sink segments is pulled into conformance with an inner shell radius of the stator shell.

11. An elevator system comprising:
an elevator car;
a drive member operably connected to the elevator car;
a traction sheave in frictional contact with the drive member;
a machine operably connected to the traction sheave, the machine including:
a rotor including a plurality of permanent magnets, the rotor rotatable about a central axis of the machine;
a stator including:
a cylindrical stator shell;
a plurality of stator windings disposed at the stator shell and located radially inboard of the plurality of permanent magnets;
two or more heat sink segments secured to a radially inboard surface of the stator shell, each heat sink segment of the two or more heat sink segments including:
a base portion located at the radially inboard surface; and
a plurality of fins extending radially inwardly from the base portion, the base portion having two or more fins of the plurality of fins extending therefrom;
wherein a base thickness of the base portion of each heat sink segment decreases with distance extending circumferentially away from a circumferential center of the base portion.

12. The elevator system of claim 11, wherein the two or more heat sink segments and the stator shell are formed from dissimilar materials.

13. The elevator system of claim 11, wherein the two or more heat sink segments are formed from aluminum.

14. The elevator system of claim 11, wherein an outer base radius of each heat sink segment is less than an inner shell radius of the stator shell.

15. The elevator system of claim 11, further comprising a blower to urge a cooling airflow across the two or more heat sink segments to cool the plurality of stator windings.

16. The elevator system of claim 11, further comprising a central shaft to convey a cooling airflow toward the two or more heat sink segments.

17. A method of cooling stator windings of an electric machine comprising:
urging a cooling airflow into the machine toward a stator assembly of the machine, the stator assembly including:
a cylindrical stator shell;
a plurality of stator windings disposed at the stator shell and located radially inboard of a rotor of the machine;
two or more heat sink segments secured to a radially inboard surface of the stator shell, each heat sink segment of the two or more heat sink segments including:
a base portion located at the radially inboard surface; and
a plurality of fins extending radially inwardly from the base portion, the base portion having two or more fins of the plurality of fins extending therefrom;
wherein a base thickness of the base portion of each heat sink segment decreases with distance extending circumferentially away from a circumferential center of the base portion;
flowing the cooling airflow across the two or more heat sink segments, thus transferring thermal energy between the cooling airflow and the plurality of stator windings; and
cooling the plurality of stator windings via the thermal energy transfer.

* * * * *